ized annular magnet which cooperates with axial bounding surfaces of the stator poles outside the stator coil ends, which enables the axial height of the stator iron to be reduced without reducing the effective surface area of the stator teeth. This construction enables Hall elements to be mounted on a p.c. board, which Hall elements are arranged in the main field of the rotor magnet.

United States Patent [19]
Janson

[11] Patent Number: 4,626,727
[45] Date of Patent: Dec. 2, 1986

[54] FLAT, PERMANENT MAGNET ELECTRIC MOTOR

[75] Inventor: Jan Janson, Eindhoven, Netherlands

[73] Assignee: U.S. Philips Corporation, New York, N.Y.

[21] Appl. No.: 635,775

[22] Filed: Jul. 30, 1984

[30] Foreign Application Priority Data

May 11, 1984 [NL] Netherlands .......................... 8401519

[51] Int. Cl.⁴ ............................................. H02K 21/12
[52] U.S. Cl. .................................... 310/156; 310/268; 310/67 R
[58] Field of Search ................. 310/156, 268, 40 MM, 310/68 R, 67 R, 113, 166, 168, 171

[56] References Cited

U.S. PATENT DOCUMENTS

| | | | |
|---|---|---|---|
| 3,922,574 | 11/1975 | Whiteley | 310/268 X |
| 3,993,920 | 11/1976 | Sato | 310/268 X |
| 4,194,743 | 3/1980 | Ohsawa et al. | 310/268 X |
| 4,260,915 | 4/1981 | Kawasumi | 310/156 X |
| 4,260,920 | 4/1981 | Nakamura | 310/156 |
| 4,361,776 | 11/1982 | Hayashi et al. | 310/156 X |

Primary Examiner—Mark O. Budd
Attorney, Agent, or Firm—David R. Treacy

[57] ABSTRACT

A flat collectorless motor is described whose rotor has been provided with an axially magnetized annular magnet which cooperates with axial bounding surfaces of the stator poles outside the stator coil ends, which enables the axial height of the stator iron to be reduced without reducing the effective surface area of the stator teeth. This construction enables Hall elements to be mounted on a p.c. board, which Hall elements are arranged in the main field of the rotor magnet.

7 Claims, 7 Drawing Figures 4,626,727

FLAT, PERMANENT MAGNET ELECTRIC MOTOR

BACKGROUND OF THE INVENTION

The invention relates to an electric motor comprising a rotor with a permanent magnet, and a stator with an iron body which is coaxial with the rotor; and more particularly, to a motor in which the iron body is bounded in a first axial direction by a substantially plane surface which extends transversely of the rotor shaft, and forms stator teeth. The stator teeth comprise radial limbs which terminate in tooth surfaces which cooperate with the rotor through an air gap. Stator windings are arranged around at least some of the limbs of the iron body to form coil ends which project from the iron body as viewed in the first axial direction.

Such motors are described in inter alia German Offenlegungsschrift No. 28 35 210 to which U.S. Pat. No. 4,429,263 correspnds, German Offenlegungsschrift No. 31 22 049 and Netherlands Patent Application No. 79 08 925 to which U.S. Pat. No. 4,354,145 corresponds. In these motors the permanent magnet in the rotor is a radially magnetized cylindrical magnet which surrounds the stator and which cooperates with the radial end faces of the stator teeth (the tooth surfaces). If smaller axial dimensions of these motors are required in order to obtain flatter motors, the surface area of the tooth surfaces which face the rotor magnet will become too small to intercept the magnetic flux that can be produced by the rotor magnet. In the motor described in Offenlegungsschrift No. 31 22 049 the iron stator body is therefore provided with flux conductors in order to increase the axial height of said tooth surfaces. However, this demands constructionally intricate steps.

SUMMARY OF THE INVENTION

The object of the invention is to provide a motor of the type described above in which the reduction of the axial height of the iron stator body does not cause problems with respect to the linkage of the rotor-magnet flux.

In accordance with the invention, the tooth surfaces which cooperate with the rotor are situated in a plane transverse to the rotor shaft and cooperate with the rotor across an air gap in a first axial direction. At the location of the tooth surfaces, the rotor extends axially into the space which extends radially from the coil ends and is provided with a permanent-magnetic ring which is axially magnetized and which is situated adjacent the coil ends and opposite the tooth surfaces.

Apart from the fact that this construction enables the axial height of the iron stator body to be reduced without a reduction of the effective stator-teeth area, this construction has the important advantage that that axially oriented air-gap field exerts an axial force on the rotor, enabling a thrust bearing to be used without taking additional steps. Another advantage of this construction is a greater choice of the magnet material because disc-shaped magnets are easier to manufacture. A preferred embodiment using this construction may yield even further advantages.

A first characteristic feature of the preferred embodiment is that at least two magnetic-field sensors are arranged between the stator poles to cooperate directly with that rotor part which cooperates with the tooth surfaces.

This has the advantage that the main rotor field is utilized directly for driving the sensors, so that for example auxiliary magnets or magnet yoke constructions as employed in the motor in accordance with U.S. Pat. No. 4,429,263 may be dispensed with.

A second characteristic feature of the preferred embodiment is that the stator is provided with a substantially flat support which is arranged transversely of the rotor shaft and which is secured to the iron body on that surface of the body which is situated axially opposite the tooth surfaces. The support is formed with recesses for receiving the coil ends of the stator windings, which coil ends are situated on the same side of the iron body.

This simplifies the motor construction significantly, so that the cost price of the motor is reduced. The iron stator body can now be provided with the windings, after which it is secured to the support which has already largely been provided with the necessary connections and/or electronic components.

In this respect it is advantageous if the support is provided with printed circuitry and magnetic-field sensors, the electrical connections of the stator windings being made by means of the printed circuitry.

The printed circuitry enables the support to be provided with a meandering conductor track which cooperates with an auxiliary magnet system mounted on the rotor to generate a tachogenerator signal.

As a result of this a tachogenerator is obtained in a very simple way, namely by providing said support with a printed conductor track. For producing a magnetic field for said meandering track it is advantageous that the rotor comprises a substantially disc-shaped support which is mounted transversely on the shaft and which carries the annular magnet, and outside said annular magnet said support changes into a cylindrical portion which carries a second annular magnet which constitutes said auxiliary magnet system which is situated radially outside the stator poles.

The invention will now be described in more detail, by way of example, with reference to the drawings.

DESCRIPTION OF THE PREFERRED EMBODIMENT

Figure 1:
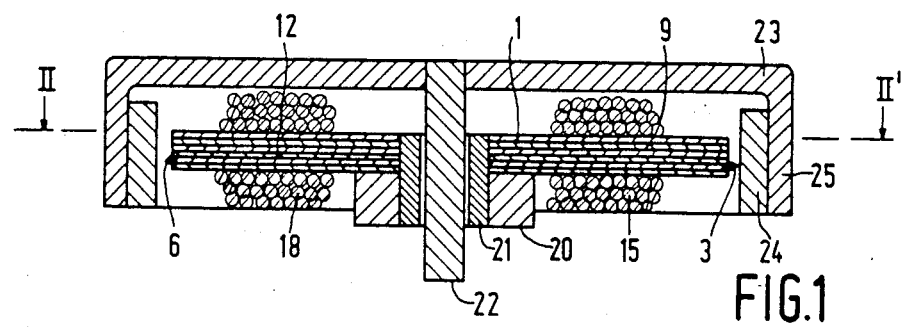
FIGS. 1 and 2 are two sectional views of a known motor, p
Figure 2:
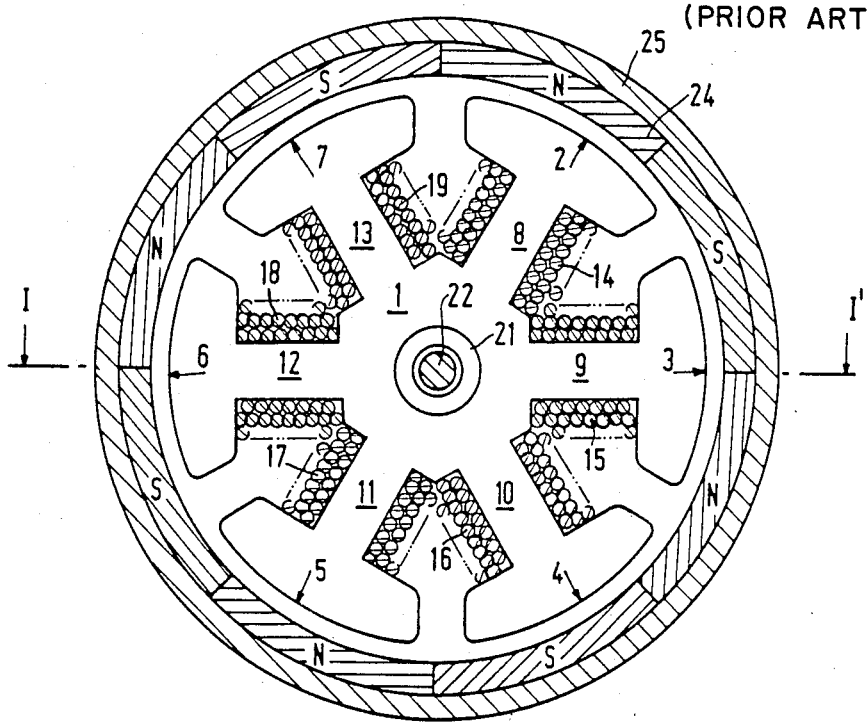

FIGS. 1 and 2 are sectional views of a known motor, FIG. 1 being a sectional view taken on the line I—I' in FIG. 2 and FIG. 2 being a sectional view taken on the line II—II' in FIG. 1. The stator comprises a star-shaped lamination assembly 1 with radial limbs 8, 9, 10, 11, 12 and 13 which terminate in stator-tooth surfaces 2, 3, 4, 5, 6 and 7, respectively which are disposed on an imaginary coaxial cylindrical surface. The limbs 8 to 13 carry windings 14 to 19, thereby forming coil ends on both sides of the stator laminations. The iron stator body is mounted on a support 20 which may be connected to, for example, a mounting plate.

The rotor comprises a shaft 22 which is mounted in the support 20 by means of a bearing 21. The shaft 22 is connected to a disc-shaped body 23 which changes into a cylindrical portion 25 which surrounds the stator and on its inner side has been provided with a cylindrical magnet 24 which is magnetized radially and which cooperates with the stator-tooth surfaces 2 to 7. In the present motor the rotor magnet has been provided with a 8-pole magnetization, the stator having 6 teeth and being of the three-phase type.

When the axial dimension of such a motor is to be reduced the problem arises that the surface area of the stator-tooth surfaces 2 to 7 which face the rotor magnet 24 becomes too small for an effective linkage of the rotor flux which issues from the rotor magnet, so that the rotor magnet cannot be utilized to an optimum extent. In the known motor in accordance with DE-OS No. 31 22 049 this problem is overcome by providing the stator teeth with flux conductors to increase the effective axial height of the tooth surfaces relative to the coil ends, which renders the stator construction intricate.

Figure 3:
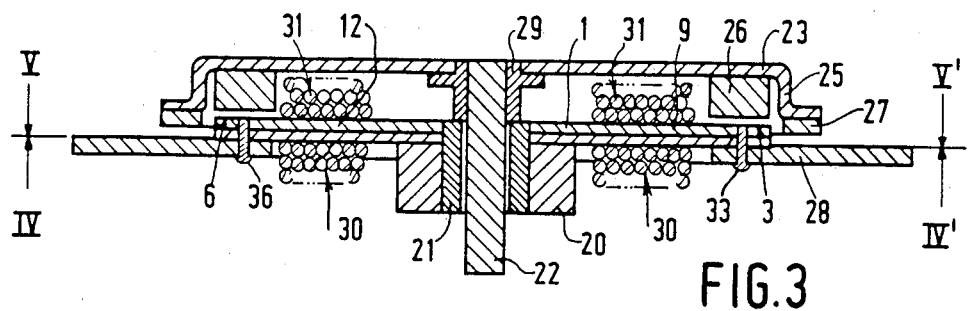
FIGS. 3, 4 and 5 are sectional views of a motor embodying the invention.
Figure 4:
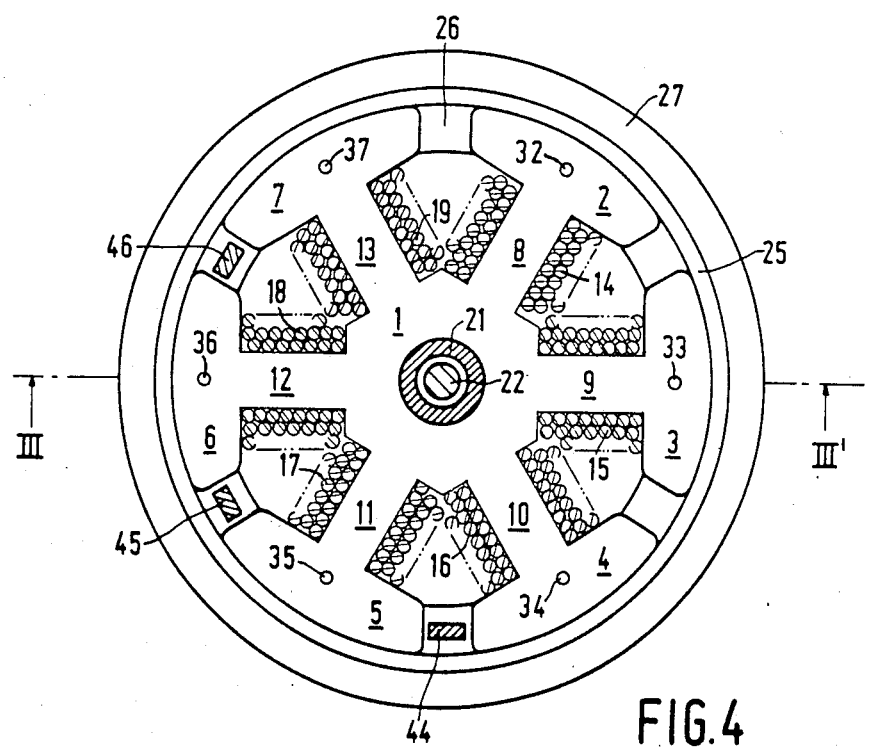
Figure 5:
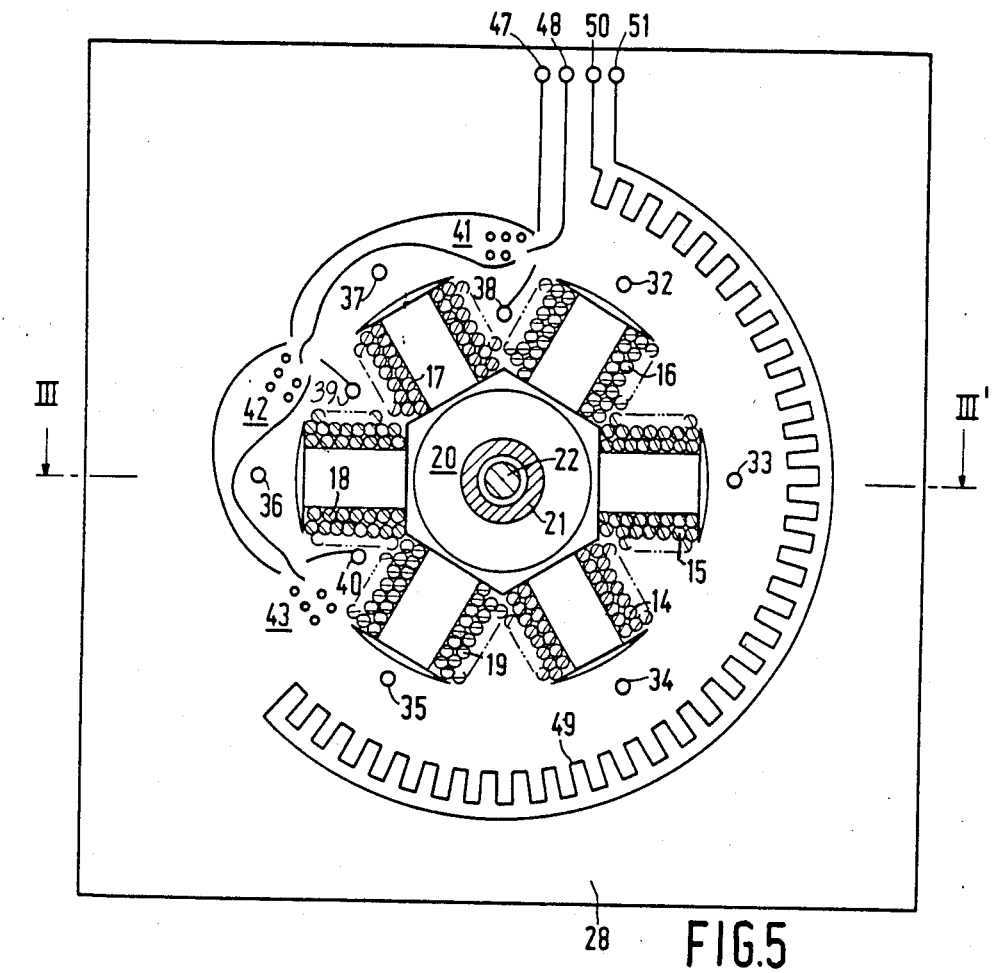

A satisfactory solution to this problem with some additional advantages is obtained by the use of the construction shown in FIGS. 3, 4 and 5 in which not the radial end faces of the stator poles but the axial end faces which are situated outside the stator coils are used as the tooth surfaces 2 to 7, so that the axial height of the iron stator body can be reduced to a limit imposed by saturation phenomena. FIG. 3 is an axial sectional view taken on the line III—III' of FIGS. 4 and 3 and FIGS. 4 and 5 are two elevations in opposite directions of the sectional view taken on the line IV—IV' (V—V') in FIG. 3, FIG. 5 showing the printed conductors. Corresponding parts bear the same reference numerals as in FIGS. 1 and 2, but the stator-tooth surfaces 2 to 7 now extend axially of the iron stator body 1 outside the stator coils 14 to 19. Instead of the cylindrical rotor magnet 24 in the motor of FIGS. 1 and 2 an annular magnet 25 is now mounted on the disc-shaped rotor support 23. This rotor magnet 28 is magnetized axially and cooperates with the stator-tooth surfaces 2 to 7 across an axial air gap. This magnet is mounted in the space adjacent the ends 31 of the windings 14 to 19 and in the present example also comprises 8 poles. As state above, this solution enables the axial height of the motor to be reduced without the use of constructionally intricate steps. An important additional advantage is that the rotor magnet exerts an axial force on the stator iron, so that a rotor support 29 mounted on the rotor shaft is drawn against the bearing 21 (thrust bearing), which renders this motor suitable for use in arbitrary positions (with respect to the direction of the force of gravity) without any additional steps. Moreover, it is substantially cheaper to construct the rotor magnet as a flat axially magnetized ring instead of a radially magnetized cylindrical ring, for example of axially prealigned sintered ferroxdure.

The use of an axially magnetized disc-shaped rotor magnet substantially simplifies the magnetization of this magnet. In such a construction it is simpler for example to make the separation between the poles depart from the radial line in order to reduce detent torques through a more gradual transition of the magnet poles across the gap between the stator poles.

One side of the iron stator body 1 is connected to the bearing 21 and the other side to a support 28 (shown in more detail in FIG. 5) via connections 32 to 37, for example metal or plastics pins, which support is constructed as a printed circuit board in which recesses are formed to accommodate the coil ends 30. In the present example this printed circuit board 28 has been provided with three contact faces 38, 39 and 40 in order to connect the stator coils in a star arrangement. Further, there are provided contacts 41, 42 and 43 for mounting the Hall ICs 44, 45 and 46 (FIG. 4). Via said p.c. board the contacts for the Hall ICs are connected to the coils and to the power supply terminals 47 and 48.

When the coils are connected correctly and the number of stator teeth and rotor poles is correct, as in the configuration shown, commutation is effected when the relevant transition between the rotor magnet poles passes the transitions between the stator teeth. The Hall elements may then be arranged between these stator teeth and can be driven directly by the rotor main magnetic field, which is not possible with the known construction because Hall elements which are mounted directly on a support cannot be arranged in the rotor main magnetic field so that as disclosed in for example DE-OS No. 28 35 210, an auxiliary yoke is required in order to conduct a part of the magnet flux to the Hall elements on the support or, as in the aforementioned Netherlands Patent Application No. 7908925, the Hall elements must be arranged in the stray field of the rotor magnet. Known motors also employ auxiliary magnets. When the Hall elements are arranged in the main field these elements will produce stronger signals so that the commutation instants are better defined.

The Hall elements are arranged at 120° electrically, i.e. in the present example between tooth surfaces 4 and 5, 5 and 6 (the same relative position with respect to the 8-pole magnet as between the tooth surfaces 2 and 3), and between the tooth surfaces 6 and 7. It is also possible to use only two Hall elements because in a three-phase system the third phase can be found by vectorial addition of the two other phases.

If a configuration is used where commutation is not effected upon passage of the transition between the teeth by the transition between the rotor coils or if it is not desirable to arrange the Hall elements between the tooth surfaces (for example in order to reduce the gaps between them), these elements may also be arranged at a larger radial distance from the shaft 22 in such a way that by broadening them they yet cooperate with the rotor magnet 26.

Figures 6A, 6B:
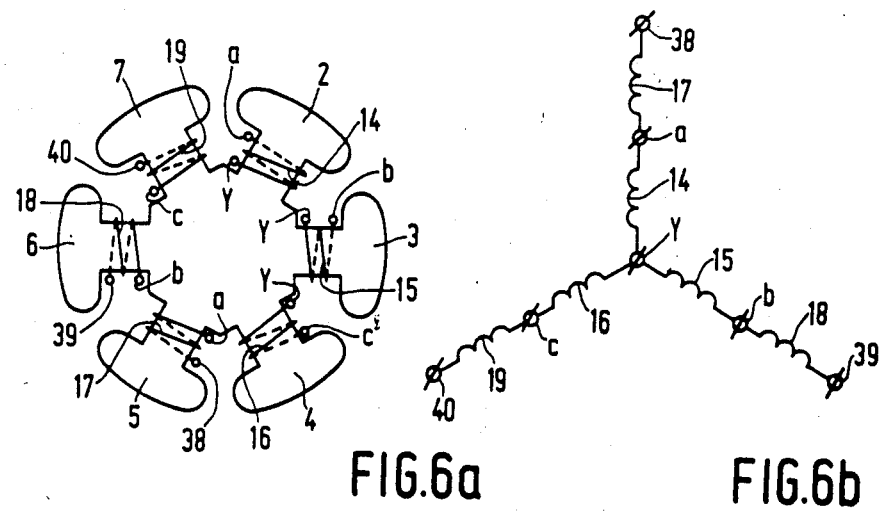
FIGS. 6a and 6b show the connections of the stator coils in the motors shown in FIGS. 3, 4 and 5.

FIG. 6a shows the iron stator body 1 with the six coils, represented schematically, and FIG. 6b shows the connections to the contacts 38, 39 and 40 required in order to obtain a star arrangement.

The drive by the Hall ICs may be such that on terminal 38 a positive voltage appears during 120° el., this terminal is floating during 60° el. (or is kept at a voltage between the two supply voltages), a negative voltage (or 0 V) appears again for 120° el., and subsequently is floating again for 60° el. (or carries half the supply voltage). The two other terminals 39 and 40 receive these driving voltages shifted through 120° el. and 240° el., respectively. For this purpose it is advantageous if the Hall ICs are equipped with an output which can carry both voltage levels and which can be floating.

For the generation of a tacho signal a meandering winding is arranged on the printed circuit board 28, which winding is connected to terminals 50 and 51. This winding is disposed in the field of a multi-pole auxiliary-magnet ring 27 which is arranged outside the stator on a circumferential flange of the cylindrical portion 25 of the rotor. In the present example the meandering winding covers only a part of the circumference in order to provide room for the printed circuitry for the electronics and the like.

Although the description relates to a three-phase version comprising 6 stator teeth and 8 rotor poles, the invention is not limited thereto. Other numbers of poles and teeth are possible, which also applies to the number of phases. Moreover, sensors other than Hall elements may be employed and various constructional details may be changed.

The motor described with reference to FIGS. 3 to 6 can be constructed very simply. The iron stator body may be blanked from sheet iron and provided with windings, after which the assembly may be mounted on the p.c. board, which has been equipped with the electronic components and tested, and the rotor is fitted.

What is claimed is:

1. An electric motor, comprising
   a rotor with a permanent magnet,
   a stator comprising an iron body which is coaxial with said rotor, said body being at least partly bounded on a first axial side by a substantially plane surface; and said body comprising radial limbs which terminate in tooth surfaces, said tooth surfaces and rotor being separated by an air gap across which the teeth and rotor cooperate via air gap flux, and
   a plurality of stator windings each arranged around a respective radially extending limb whereby each winding has a radially extending coil axis, each winding having a coil end portion which projects from the iron body in an axial direction on said first axial side,
   characterized in that said tooth surfaces which cooperate with the rotor are situated in a plane transverse to the rotor shaft on said first axial side and are disposed radially from the coil, and
   said permanent magnet is an axially magnetized permanent magnet ring arranged axially opposite said tooth surfaces and radially from said coil end portions, whereby the air gap flux is generally perpendicular to the radial limbs around which the windings are disposed.

2. An electric motor as claimed in claim 1, in which the stator has three phases and six teeth, the rotor has eight poles, and the stator windings are connected in a three-phase star arrangement, characterized in that at least two magnetic-field sensors are arranged between the stator poles to cooperate directly with that rotor part which cooperates with the tooth surfaces.

3. An electric motor as claimed in claim 1 or 2, characterized in that the stator is provided with a substantially flat support which is arranged transversely of the rotor shaft and which is situated axially opposite the tooth surfaces, which support is formed with recesses for receiving the coil ends of the stator windings, which coil ends have portions situated on said side of the iron body.

4. An electric motor as claimed in claim 3, characterized in that said support is provided with printed circuitry and magnetic-field sensors, the electrical connections of the stator windings being made by means of said printed circuitry.

5. An electric motor as claimed in claim 4, characterized in that the support is provided with a meandering conductor track which cooperates with an auxiliary magnet system which has been mounted on the rotor to generate a tacho signal.

6. An electric motor as claimed in claim 5, characterized in that the rotor comprises a substantially disc-shaped support which is mounted transversely on the shaft and which carries the annular magnet, and outside said annular magnet said support changes into a cylindrical portion which carries a second annular magnet which constitutes said auxiliary magnet system which is situated radially outside the stator poles.

7. A motor as claimed in claim 7, characterized in that said windings each have a generally radial axis extending along the respective limb.

* * * * *